United States Patent
Prokhorov et al.

(10) Patent No.: US 9,434,382 B1
(45) Date of Patent: Sep. 6, 2016

(54) VEHICLE OPERATION IN ENVIRONMENTS WITH SECOND ORDER OBJECTS

(71) Applicant: Toyota Motor Engineering & Manufacturing North America, Inc., Erlanger, KY (US)

(72) Inventors: Danil V. Prokhorov, Canton, MI (US); Xue Mei, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/662,927

(22) Filed: Mar. 19, 2015

(51) Int. Cl.
*B60W 30/09* (2012.01)
*B60W 10/18* (2012.01)
*B60W 10/20* (2006.01)
*B60W 40/04* (2006.01)
*G05D 1/00* (2006.01)

(52) U.S. Cl.
CPC .............. *B60W 30/09* (2013.01); *B60W 10/18* (2013.01); *B60W 10/20* (2013.01); *B60W 40/04* (2013.01); *G05D 1/0088* (2013.01); *B60W 2550/30* (2013.01); *B60W 2710/18* (2013.01); *B60W 2710/20* (2013.01)

(58) Field of Classification Search
CPC .... B60W 30/09; B60W 10/18; B60W 10/20; B60W 40/04; B60W 2550/30; B60W 2710/18; B60W 2710/20; G05D 1/0088
See application file for complete search history.

(56) References Cited

U.S. PATENT DOCUMENTS

| | | | |
|---|---|---|---|
| 8,254,670 B2 | 8/2012 | Prokhorov | |
| 2014/0301597 A1* | 10/2014 | Xu | G06K 9/00832 382/103 |
| 2015/0097952 A1* | 4/2015 | Eschbach | G06T 5/008 348/148 |

OTHER PUBLICATIONS

Ohn-Bar et al.; "Partially Occluded Vehicle Recognition and Tracking in 3D"; IEEE Intelligent Vehicle Symposium (IV); Jun. 23-26, 2013; pp. 1350-1355; Gold Coast, Australia; in 6 pages.
Mei et al.; "Tracking Using Multilevel Representations"; U.S. Appl. No. 14/323,360, filed Jul. 3, 2014; in 30 pages.
Mei et al.; "Parts Based Object Tracking Method and Apparatus"; U.S. Appl. No. 14/180,620, filed Feb. 14, 2014; in 19 pages.

* cited by examiner

*Primary Examiner* — Aaron L Troost
(74) *Attorney, Agent, or Firm* — Christopher G. Darrow; Darrow Mustafa PC (57) ABSTRACT

Arrangements related to the detection of objects in an external environment of a vehicle are presented. At least a portion of the external environment can be sensed to detect a first order object therein. It can be determined whether the first order object includes a translucent portion. Responsive to determining that the first order object includes a translucent portion, the translucent portion can be analyzed to determine whether a second order object is located within the translucent portion. Responsive to determining that a second order object is located within the translucent portion, the second order object can be analyzed. Information about the second order object can be presented to a vehicle occupant, an alert regarding the second order object can be presented to a vehicle occupant, and/or, when the vehicle is an autonomous vehicle, a driving maneuver for the autonomous vehicle can be determined.

20 Claims, 4 Drawing Sheets

VEHICLE OPERATION IN ENVIRONMENTS WITH SECOND ORDER OBJECTS

FIELD

The subject matter described herein relates in general to vehicles and, more particularly, to the operation of vehicles in external environments in which one or more objects are located behind other objects.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment. In some instances, there may be one or more objects in the surrounding environment that are located behind another object, causing them to be hidden from the vehicle sensors.

SUMMARY

In one respect, the present disclosure is directed to a method of detecting objects in an external environment of a vehicle. The method can include sensing at least a portion of the external environment to detect a first order object therein. The method can also include determining whether the first order object includes a translucent portion. The method can further include, responsive to determining that the first order object includes a translucent portion, analyzing the translucent portion to determine whether a second order object is located within the translucent portion. Such analyzing can be performed using a processor. In addition, the method can include, responsive to determining that a second order object is located within the translucent portion, analyzing the second order object. Such analyzing can be performed using the processor.

In another respect, the present disclosure is directed to a system for detecting objects in an external environment of a vehicle. The system includes a sensor system operable to sense at least a portion of the external environment to detect a first order object therein. The system includes a processor operatively connected to the sensor system. The processor can be programmed to initiate executable operations. The executable operations can include determining whether the first order object includes a translucent portion. The executable operations can also include, responsive to determining that the first order object includes a translucent portion, analyzing the translucent portion to determine whether a second order object is located within the translucent portion. The executable operations can further include, responsive to determining that a second order object is located within the translucent portion, analyzing the second order object.

In yet another respect, the present disclosure is directed to a computer program product for operating an autonomous vehicle in occupant view and vehicle sensor obstructed environments. The computer program product includes a computer readable storage medium having program code embodied therein. The program code is executable by a processor to perform a method. The method includes sensing at least a portion of the external environment to detect a first order object therein. The method also includes determining whether the first order object includes a translucent portion. The method further includes, responsive to determining that the first order object includes a translucent portion, analyzing, using a processor, the translucent portion to determine whether a second order object is located within the translucent portion. The method includes, responsive to determining that a second order object is located within the translucent portion, analyzing, using the processor, the second order object.

DETAILED DESCRIPTION

This detailed description relates to detecting objects in an external environment of a vehicle. More particularly, this detailed description relates to the detection and/or analysis of second order objects in an external environment of a vehicle. As used herein, a "second order object" is an object that is located behind another object relative to one or more vehicle sensors. A "first order object" is an object that is not located behind another object relative to one or more vehicle sensors.

In one or more implementations, it can be determined whether a detected first order object includes a region of interest. In one or more arrangements, the region of interest can be a window or other translucent portion of an object. In response to determining that the first order object includes a region of interest, the region of interest can be analyzed to determine whether a second order object is located within the region of interest. In response to determining that a second order object is located within the region of interest, the second order object can be analyzed. The present detailed description relates to systems, methods and computer program products that incorporate such features. In at least some instances, such systems, methods and computer program products can enable human drivers to make more informed driving decisions and/or can improve the operation of highly automated vehicles.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
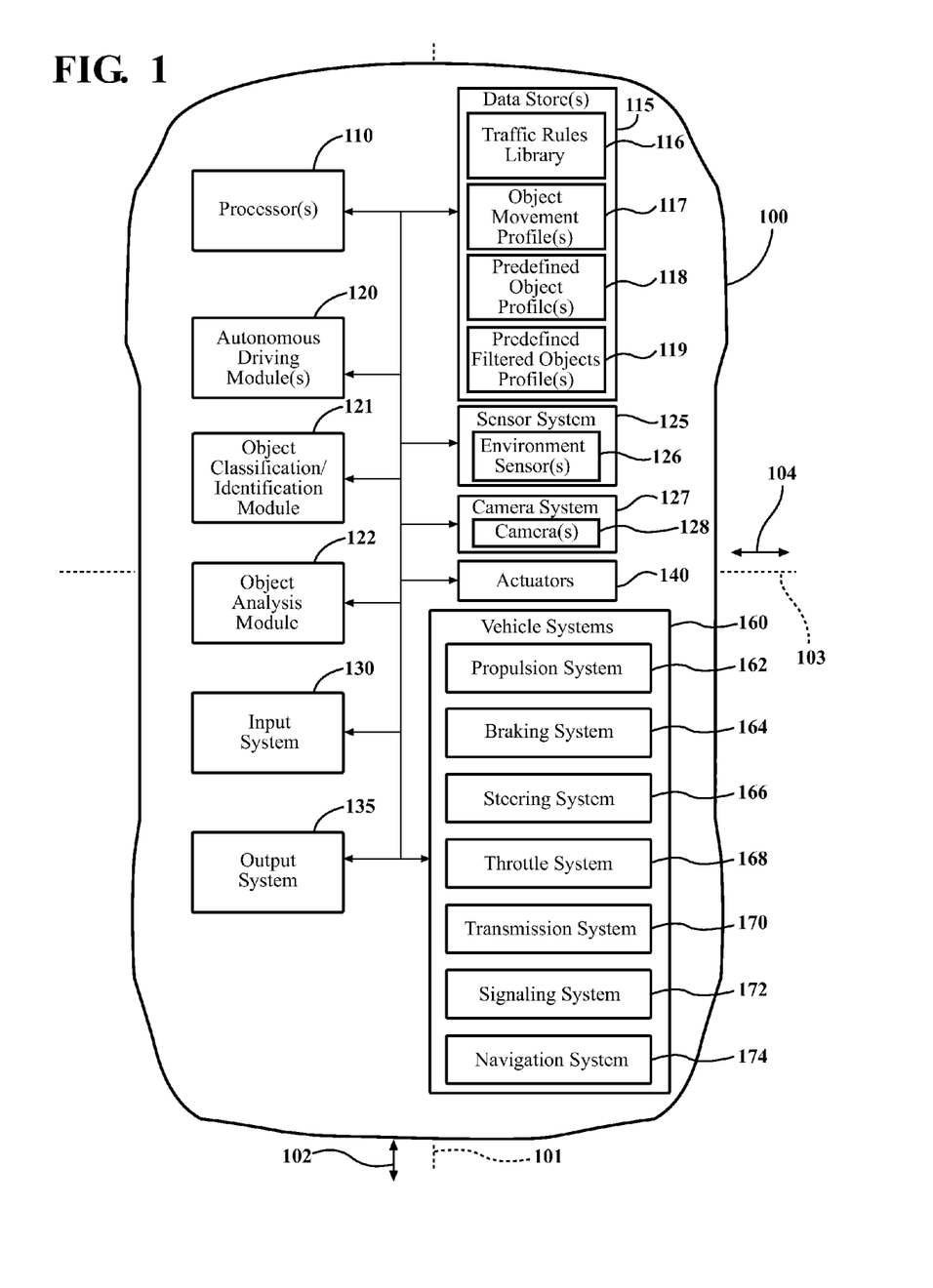
FIG. 1 is an example of an autonomous vehicle.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In one or more implementations, the vehicle 100 may be a watercraft, an aircraft or any other form of motorized transport.

The vehicle 100 can have an associated longitudinal axis 101, which can be the central axis of the vehicle 100. The vehicle 100 can have an associated longitudinal direction 102. "Longitudinal direction" means any direction that is substantially parallel to and/or substantially co-linear with the longitudinal axis 101. As used herein, the term "substantially" includes exactly the term it modifies and slight variations therefrom. Thus, the term "substantially parallel" means exactly parallel and slight variations therefrom (e.g. within normal manufacturing tolerances, within about 10 degrees or less, within about 5 degrees or less, within about 3 degrees or less, etc.). The vehicle 100 can have an associated lateral axis 103, which can be substantially perpendicular to the longitudinal axis 101. The vehicle 100 can have an associated lateral direction 104. "Lateral direction" means any direction that is substantially parallel to and/or substantially co-linear with the lateral axis 103.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated.

In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver. The manual mode can include vehicles in which some of the vehicle systems, operations and/or functions that are automated. As an example, a vehicle that is operated manually but includes cruise control or adaptive cruise control systems can be considered to be in the manual mode. While arrangements will be described herein in connection with an autonomous vehicle, it will be understood that arrangements are not limited to autonomous vehicles. Indeed, in some arrangements, the vehicle 100 can be configured to operate in only a manual mode.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The one or more data stores 115 can stores any suitable type of data. For instance, in one or more arrangements, the one or more data stores 115 can include one or more traffic rules libraries 116. In one or more arrangements, the traffic rules libraries 116 can be located in a source external to the vehicle 100 (e.g. in a cloud-based data store). In one or more arrangements, the one or more traffic rules libraries 116 can be included as part of one or more of the data stores 115. In one or more arrangements, the traffic rules libraries 116 can be included as part of and/or accessed by one or more modules (e.g. the object classification/identification module 121 and/or the object analysis module 122).

The traffic rules library 116 can include a set of traffic rules. The term "set of traffic rules" means one or more traffic rules. As used herein, "traffic rule" is any law, rule, ordinance or authority that governs the operation of a motor vehicle, including motor vehicles in motion and motor vehicles that are parked or otherwise not in motion. The traffic rules can be international, federal, national, state, city, township and/or local laws, rules, ordinances and/or authorities.

In one or more arrangements, the vehicle 100 can include one or more object movement profiles 117. In one or more arrangements, the object movement profiles 117 can be included as part of one or more of the data stores 115. In one or more arrangements, the object movement profiles 117 can be located in a source external to the vehicle 100 (e.g. in a cloud-based data store). In one or more arrangements, the object movement profiles 117 can be included as part of and/or accessed by one or more modules (e.g. the object classification/identification module 121 and/or the object analysis module 122).

In one or more arrangements, one or more object movement profiles 117 can include any information or data that defines and/or is indicative of a movement of an object (e.g. a vehicle). Examples of such movements can include approaching, moving away from, stopping, slowing down, and/or crossing transversely with respect to the vehicle 100, just to name a few possibilities. For instance, headlights growing in size may be indicative of a vehicle heading toward the vehicle 100 from an opposite direction.

Other motions can be included in the object movement profiles 117. For example, one or more of the object movement profiles 117 can be directed to sliding motions, such as may occur when an object is moving on a wet, icy, and/or snowy road. In one or more arrangements, one or more of the object movement profiles 117 can be can be directed to swerving motions, such as may occur when an object is a vehicle being operated by an intoxicated, drowsy and/or distracted driver. In one or more arrangements, one or more of the object movement profiles 117 can be directed to movements or motions that are in violation of a traffic rule.

In one or more arrangements, the vehicle 100 can include one or more predefined object profiles 118. In one or more arrangements, the predefined object profiles 118 can be included as part of one or more of the data stores 115. In one or more arrangements, the predefined object profiles 118 can be located in a source external to the vehicle 100 (e.g. in a cloud-based data store). In one or more arrangements, the predefined object profiles 118 can be included as part of and/or accessed by one or more modules (e.g. the object classification/identification module 121 and/or the object analysis module 122).

The predefined object profiles 118 can include data and/or information regarding a plurality of different objects. The predefined object profiles 118 can include data and/or information relating to one or more vehicles and/or one or more parts thereof (e.g. one or more windows, headlights, taillights, license plates, wheels, tires, etc.). Alternatively or in addition, the predefined object profiles 118 can include data and/or information relating to non-vehicular objects (e.g. pedestrians, animals, etc.). The data/information can be provided in any suitable form. For instance, the data/information can be images or other information (e.g. one or more dimensions, physical characteristics, electromagnetic signatures, etc.).

In one or more arrangements, the vehicle 100 can include one or more predefined filtered object profiles 119. In one or more arrangements, the one or more predefined filtered object profiles 119 can be included as part of one or more of the data stores 115. In one or more arrangements, the one or more predefined filtered object profiles 119 can be located in a source external to the vehicle 100 (e.g. in a cloud-based data store). In one or more arrangements, the one or more predefined filtered object profiles 119 can be included as part of one or more modules (e.g. the object classification/identification module 121 and/or the object analysis module 122).

The one or more predefined filtered object profiles 119 can include any information or data relating to objects that are to be ignored or filtered from a region of interest of a first order object. As used herein, "region of interest" means any portion of a detected object that is identified for additional analysis. The predefined filtered object profiles 119 can be objects that are typically expected to be present in the region of interest of a first order object. As an example, the one or more predefined filtered object profiles 119 can include any information or data relating to objects associated with the first order object that are to be ignored or filtered from a region of interest.

For instance, in one or more arrangements, the region of interest can be a translucent portion (e.g. a window) of a vehicle. In such case, examples of predefined filtered object profiles 119 include one or more body parts of human occupants (e.g. head, shoulders, etc.) and/or one or more vehicle interior components (e.g. vehicle seats, headrests, rearview mirrors, etc.) and/or one or more vehicle accessories (e.g. window mounted toll payment devices, air fresheners hanging from the rearview mirror, decorations hanging from the rearview mirror or applied to a window, etc.), just to name a few possibilities.

The vehicle 100 can include a driving module 120. The driving module 120 can be implemented as computer readable program code that, when executed by a processor, implement one or more of the various processes described herein. For example, in the case of an autonomous operational mode, such processes can include determining current driving maneuvers for the vehicle 100, future driving maneuvers and/or modifications to current or future vehicle driving maneuvers. The driving module 120 can also cause, directly or indirectly, such driving maneuvers or modifications thereto to be implemented. As another example, in non-autonomous vehicle applications or in a manual operational mode, such processes can include determining when to issue a warning or alert to the driver of the vehicle 100.

The driving module 120 can be a component of the processor 110, or the driving module 120 can be executed on and/or distributed among other processing systems to which the processor 110 is operatively connected. The driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 160). Such instructions can include issuing warnings, alerts and/or notifications to one or more vehicle occupants. Alternatively or in addition, the data store 115 may contain such instructions.

The vehicle 100 can include an object classification/identification module 121. The object classification/identification module 121 can be implemented as computer readable program code that, when executed by a processor, implement one or more of the various processes described herein. The object classification/identification module 121 can be a component of the processor 110, or the object classification/identification module 121 can be executed on and/or distributed among other processing systems to which the processor 110 is operatively connected.

The object classification/identification module 121 can be configured to detect, analyze, assess and/or interpret information about an external environment of the vehicle 100 to classify and/or identify one or more objects in the external environment. In one or more arrangements, the object classification/identification module 121 can include artificial or computational intelligence elements, e.g., neural network, fuzzy logic or other machine learning algorithms.

The object classification/identification module 121 can be configured to classify and/or identify any type of object in the external environment. For instance, the object classification/identification module 121 can be configured to classify and/or identify detected objects as vehicles, bicyclists, pedestrians, animals or other suitable category or class. The object classification/identification module 121 can be configured to classify objects detected in the external environment. For instance, the object classification/identification module 121 can classify objects as first order object or second order objects. These are just a few of the potential classifications into which objects can be classified by the object classification/identification module 121.

In one or more arrangements, the object classification/identification module 121 can be configured to classify and/or identify one or more regions of interest of a detected object. One example of a region of interest with respect to other detected vehicles, particularly other vehicles that are first order objects, is one or more translucent portions. As used herein, "translucent portion" means that any structure, element, region, and/or area of a detected object through which light can at least partially pass. Thus, when the translucent portion is viewed from one side, one or more objects located on the opposite side of the translucent portion are at least partially visually or otherwise detectable by vehicle sensors. As used herein, "translucent" includes translucent as well as transparent. One example of a translucent portion of a vehicle is a window (e.g. front windshield, rear windshield, side windows, etc.).

In some instances, the translucent portion can include a plurality of overlapping translucent portions of the same first order object with respect to one or more of the vehicle sensors. For instance, when the first order object is another vehicle located in front of and in the same travel lane as the vehicle 100, the translucent portion can be defined by the rear window of the first order object and/or the front window of the first order object. In such instances, the translucent portion can be defined by the overlapping portions of the front window and the rear window.

In some arrangements, the sensor system 125, the processor 110, and/or the object classification/identification module 121 can be configured to detect, determine, assess, measure, quantify and/or sense, directly or indirectly, one or more dimensions of a detected object. For instance, based on data received from one or more sensors of the sensor system 125, a direct measurement of one or more dimensions of a detected object can be determined. Examples of dimensions that can be detected, determined, assessed, measured, quantified and/or sensed, directly or indirectly, include length, width and/or height.

The object classification/identification module 121 can also include any suitable vehicle recognition software or other object recognition software. The vehicle recognition software or other object recognition software can analyze one or more images captured by a camera system 126 of the vehicle 100. The vehicle recognition software or other object recognition software can query the one or more predefined object profiles 118 for possible matches. For instance, images captured by the camera system 127 can be compared to images in the predefined object profiles 118 for possible matches. Alternatively or in addition, measurements or other aspects of an image captured by the camera system 127 and/or the sensor system 125 can be compared to measurements or other information or data in the predefined object profiles 118. The object classification/identification module 121 can identify the detected object as a particular type of vehicle if there is a match between the captured image and an image in the vehicle database. In this context, "match" or "matches" means that an image or other information/data collected by the sensor system 125 or the camera system 127 is substantially identical to one or more of the predefined object profiles 118. For instance, the an image or other information collected by the camera system 127 and one or more of the images in the predefined object profiles 118 can match within a predetermined probability (e.g., at least about 85%, at least about 90%, at least about 95% or greater) or confidence level.

In one or more arrangements, the vehicle 100 can include an object analysis module 122. The object analysis module 122 can be implemented as computer readable program code that, when executed by a processor, implement one or more of the various processes described herein. The object analysis module 122 can be a component of the processor 110, or the object analysis module 122 can be executed on and/or distributed among other processing systems to which the processor 110 is operatively connected. In one or more arrangements, the object analysis module 122 can include artificial or computational intelligence elements, e.g., neural network, fuzzy logic or other machine learning algorithms.

The object analysis module 122 can be configured to analyze, assess and/or interpret information about an object or a portion thereof detected in the external environment of the vehicle 100. In one or more arrangements, the object analysis module 122 can be configured to analyze, assess and/or interpret information about a region of interest of a detected first order object in the external environment of the vehicle 100. In one or more arrangements, the object analysis module 122 can be configured to analyze, assess and/or interpret information about a second order object detectable within a region of interest of a first order object. As an example, when the region of interest is a translucent portion, the object analysis module 122 can be configured to analyze, assess and/or interpret information about the translucent portion.

The object analysis module 122 can be configured to detect relevant parts of first and/or second order vehicles and/or relevant second order objects (pedestrians, bicyclists, etc.). The object analysis module 122 can be configured to track the motion of second order objects. As an example, the object analysis module 122 can be configured to detect one or more second order objects through the window(s) of a first order object (e.g. another vehicle located in front of the vehicle 100. The object analysis module 122 can be configured to track the behavior and/or movement of the one or more second order objects. The object analysis module 122 can be configured for part-based reasoning for image understanding. Thus, the object analysis module 122 can be configured to detect and/or recognize sub-features of a second order object. For instance, with respect to another vehicle, such sub-features can include headlights, taillights, and/or license plates, just to name a few possibilities. The object analysis module 122 can implement any suitable form of object behavior and/or movement tracking, now known or later developed.

The object analysis module 122 can be configured to ignore or filter and thus effectively ignore one or more objects from a region of interest that are not pertinent to the analysis of the object analysis module 122. To that end, the object analysis module 122 can include and/or have access to the one or more predefined filtered object profiles 119. For instance, when the region of interest is one or more windows of a vehicle (e.g. a rear window and/or a front window), the object analysis module 122 can filter headrests, rearview mirrors, visors, decals, toll payment devices, and human occupant body parts (e.g. heads) detectable within the window.

As an example, the object analysis module 122 can analyze an image captured by the camera system 127. The image may be a portion of an image, such as a portion including the region of interest. The object analysis module 122 can query the predefined filtered object profiles 119 for possible matches. If there is a match, the objects in the region of interest that match one or more of the predefined filtered object profiles 119 can be ignored or filtered from consideration or analysis.

While the various modules 120, 121, 122 are shown and described as being separate modules, it will be understood that arrangements are not limited in this regard. Indeed, the modules 120, 121, 122 can be a single module, or two or more of the modules 120, 121, 122 or portions thereof can be combined in any suitable manner.

As noted above, the vehicle 100 can include the sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. The sensor system 125 and/or the one or more sensors can be operatively connected to the processor 110, the data store 115, the driving module 120 and/or other element of the vehicle 100.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more environment sensors 126. The environment sensors 126 can be configured to detect, determine, assess, monitor, measure, quantify and/or sense objects in at least a portion of the external environment of the vehicle 100 and/or information/data about such objects. The one or more environment sensors 126 can be provided in any suitable location of the vehicle. In one or more arrangements, one or more of the environment sensors 126 can use at least in part radio signals (e.g. RADAR based sensors). In one or more arrangements, one or more of the environment sensors 126 can use at least in part lasers (e.g. LIDAR based sensors). In one or more arrangements, one or more of the environment sensors 126 can use at least in part ultrasound signals. In one or more arrangements, one or more of the environment sensors 126 can use at least in part any other suitable type of signal. In one or more arrangements, one or more of the environment sensors 126 can use at least in part any combination of the above signals. The sensor system 125 can include any combination of the above and/or other types of environment sensors 126.

The one or more environment sensors 126 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 102, the lateral direction 104 and/or other direction(s)), the speed of each detected object and/or the movement of each detected object, just to name a few possibilities.

In some arrangements, the sensor system 125, the processor 110, and/or one or more of the modules 120, 121, 122 can be configured to detect, determine, assess, monitor, measure, quantify and/or sense, directly or indirectly, one or more aspects, characteristics and/or properties of a detected object. For example, the sensor system 125, the processor 110, and/or one or more of the modules 120, 121, 122 can be configured to detect, determine, assess, monitor, measure, quantify and/or sense, directly or indirectly, the size, relative size, length, width, height, a dimension, the material, a material property, the speed, the acceleration and/or the trajectory of a detected object.

Alternatively or in addition to any of the sensors described above, the sensor system 125 can include other types of sensors. The sensor system 125, the processor 110, and/or one or more of the modules 120, 121, 122 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100. As another example, one or more sensors can be provided in one or more elevated positions of the vehicle 100 to provide a different detection area for the sensor system 125.

As noted above, the vehicle 100 can include a camera system 127. In one or more arrangements, the camera system 127 can be a part of the sensor system 125. The camera system 127 can include a one or more cameras 128. "Camera" is defined as any device, component, and/or system that can capture visual data. "Visual data" includes video and/or image information/data. The visual data can be in any suitable form. The one or more cameras 128 can be high resolution cameras. The high resolution can refer to the pixel resolution, the spatial resolution, spectral resolution, temporal resolution and/or radiometric resolution. In one or more arrangements, the one or more cameras 128 can be high dynamic range (HDR) cameras or infrared (IR) cameras.

In one or more arrangements, one or more of the cameras 128 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. One or more of the cameras 128 can be configured with zoom in and/or zoom out capabilities.

In one or more arrangements, one or more of the cameras 128 can be oriented, positioned, configured, operable and/or arranged to capture visual data from at least a portion of the external environment of the vehicle 100. The one or more cameras 128 can be located in any suitable portion of the vehicle 100. For instance, one or more of the cameras 128 can be located within the vehicle 100. One or more of the cameras 128 can be located on the exterior of the vehicle 100. One or more of the cameras 128 can be located on or exposed to the exterior of the vehicle 100.

The position of one or more of the cameras 128 can be fixed such that its position does not change relative to the vehicle 100. One or more of the cameras 128 can be movable so that its position can change to allow visual data from different portions of the external environment of the vehicle 100 to be captured. The movement of the cameras 128 can be achieved in any suitable manner. For instance, the cameras 128 can be rotatable about one or more axes, pivotable, slidable and/or extendable, just to name a few possibilities. In one or more arrangements, the cameras 128 can have any suitable range of motion, including, for example, substantially spherical, substantially hemi-spherical, substantially circular and/or substantially linear. As used herein, the term "substantially" includes exactly the term it modifies and slight variations therefrom. Thus, for example, the term "substantially spherical" means exactly spherical and slight variations therefrom. The one or more cameras 128 and/or the movement of the one or more cameras 128 can be controlled by the camera system 127, the sensor system 125, the processor 110 and/or any one or more of the modules 120, 121, 122.

The vehicle 100 can include an input system 130. An "input system" is defined as any device, component, system, element or arrangement or groups thereof that enable information/data to be entered into a machine. The input system 160 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" is defined as any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display, as described above. Alternatively or in addition, the output system 135 may include a microphone, earphone and/or speaker. Some components of the vehicle 100 may serve as both a component of the input system 130 and a component of the output system 135.

In one or more arrangements described herein, at least a portion of the output system 135 can be activated to provide an alert based on the presence, behavior, and/or movement of a second order object. The output system 135 can be configured to present an alert to one or more occupants of the vehicle 100. The alert can be any type of alert, including, for example, a visual alert. "Visual alert" is any output that provides information in a manner that is perceptible to the human sense of sight. The visual alert can visually alert a vehicle occupant to the presence of, behavior of, movement of and/or other information about a second order object detected in the external environment of the vehicle 100.

The visual alert can be presented by one or more components of the output system 135, such as one or more displays and/or one or more light sources located within in the vehicle 100. A "display" is defined as a component or a group of components that present information/data in visual form, including, for example, video, images, graphics, etc. In one or more arrangements, the display can be located in a front interior portion of a vehicle 100. As an example, the display can be included in a dashboard or instrument panel (not shown) of the vehicle 100.

The display can be any suitable type of display. For instance, the display can be a liquid crystal display (LCD), a light emitting diode (LED) display or some other suitable display. In one or more arrangements, the display can be a touch screen display, a multi-touch display or a remotely controlled display. A touch screen can allow a user to engage or interact with one or more displayed elements, such as a graphical user interface (GUI), and/or other applications running on any vehicle system, including any of those described herein, through contact with the forward display. For example, a user may make selections and move a cursor by simply touching the forward display via a finger or stylus.

The visual alert can have any suitable form. In one or more arrangements, the visual alert can be a word, a phrase or a message presented on the display. Alternatively or in addition, the visual alert can be presented by activating one or more light sources. The one or more light sources can generate or emit any type of light energy.

Alternatively or in addition being a visual alert, the alert can be an audial alert. "Audial alert" is any output that provides information in a manner that is perceptible to the human sense of hearing. The audial alert can inform a vehicle occupant to the presence of an object detected in the external environment of the vehicle 100 that is located outside of the determined occupant viewable area. The audial alert can have any suitable form. The audial alert can be presented by one or more components of the output system 135, such as by being emitted over one or more speakers or over one or more in-vehicle audio channels. "Speaker" means one or more elements, one or more devices, one or more components, one or more systems, and/or any combination thereof that produce sound in response to an audio signal input. Examples of speakers include, for example, electroacoustic transducers, sound chips, and sound cards. Each speaker can have one or more audio output channels (not shown) operatively connected thereto. "Audio output channel" means any suitable device, component or structure for carrying audio signals. The audial alert can be a sound, a plurality of sounds, a word, a phrase or a message.

The vehicle 100 can include one or more vehicle systems 160. Various examples of the one or more vehicle systems 160 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 162. The propulsion system 162 can include one or more mechanisms, devices, elements, components, systems, and/or combinations thereof, now known or later developed, configured to provide powered motion for the vehicle 100. The propulsion system 162 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 164. The braking system 164 can include one or more mechanisms, devices, elements, components, systems, and/or combinations thereof, now known or later developed, configured to decelerate the vehicle 100. As an example, the braking system 164 can use friction to slow the wheels/tires. The braking system 164 can convert the kinetic energy of the wheels/tires to electric current.

Further, the vehicle 100 can include a steering system 166. The steering system 166 can include one or more mechanisms, devices, elements, components, systems, and/or combinations thereof, now known or later developed, configured to adjust the heading of the vehicle 100.

The vehicle 100 can include a throttle system 168. The throttle system 168 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 172. The signaling system 172 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 172 can provide information regarding the vehicle's presence, position, size, direction of travel, and/or the driver's intentions regarding direction and speed of travel. For instance, the signaling system 172 can include headlights, taillights, brake lights, hazard lights and turn signal lights.

The vehicle 100 can include a navigation system 174. The navigation system 174 can include one or more mechanisms, devices, elements, components, systems, applications and/or combinations thereof, now known or later developed, configured to determine the geographic location of the vehicle 100 and/or to determine a travel route for the vehicle 100.

The navigation system 174 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 174 can be configured to update the travel route dynamically while the vehicle 100 is in operation.

The navigation system 174 can include a global positioning system, a local positioning system or a geolocation system. The navigation system 174 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 174 can use Transmission Control Protocol (TCP) and/or a Geographic information system (GIS) and location services.

The navigation system 174 may include a transceiver configured to estimate a position of the vehicle 100 with respect to the Earth. For example, navigation system 174 can include a GPS transceiver to determine the vehicle's latitude, longitude and/or altitude. The navigation system 174 can use other systems (e.g. laser-based localization systems, inertial-aided GPS, and/or camera-based localization) to determine the location of the vehicle 100.

Alternatively or in addition, the navigation system 174 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the driving module 120 can be operatively connected to communicate with the various vehicle systems 160 and/or individual components thereof. For example, returning to FIG. 1, the processor 110 and/or the driving module 120 can be in communication to send and/or receive information from the various vehicle systems

160 to control the movement, speed, maneuvering, heading, direction, etc. of vehicle 100. The processor 110 and/or the driving module 120 may control some or all of these vehicle systems 160 and, thus, may be partially or fully autonomous. In a manual mode of operation, the various vehicle systems 160 and/or individual components thereof can be controlled by user input.

The processor 110 and/or the driving module 120 may be operable to control the navigation and/or maneuvering of the vehicle 100 by controlling one or more of the vehicle systems 160 and/or components thereof. For instance, when operating in an autonomous mode, the processor 110 and/or the driving module 120 can control the direction and/or speed of the vehicle 100. The processor 110 and/or the driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 160 or components thereof to responsive to receiving signals or other inputs from the processor 110 and/or the driving module 120. Any suitable actuator, now known or later developed, can be used. For instance, the one or more actuators 160 can include motors, pneumatic actuators, hydraulic pistons, relays, solenoids, and/or piezo-electric actuators, just to name a few possibilities.

According to arrangements herein, the vehicle 100 (or one or more elements thereof) can be configured to detect one or more first order objects in the external environment. The vehicle 100 (or one or more elements thereof) can be configured to determine whether the one or more first order objects includes a region of interest, such as, for example, a translucent portion. The vehicle 100 (or one or more elements thereof) can be configured to analyze the region of interest to determine whether a second order object is located within the region of interest.

In one or more arrangements, in response to determining that a second order object is located within a region of interest of a first order object, the second order object can be analyzed. The vehicle 100 can be configured to take one or more actions based at least in part on the analysis of the second order object. Any suitable action can be taken based at least in part on the analysis of the second order object.

In one or more arrangements, the action can include presenting information relating to and/or based on the second order object to one or more vehicle occupants. In one or more arrangements, the action can include presenting an alert, warning, and/or notification within the vehicle 100. In one or more arrangements, an alert, warning, and/or notification can be presented responsive to determining that the second order object is exhibiting a predefined behavior. In one or more arrangements, the action can be determining a driving maneuver for the autonomous vehicle at least partially based on information about the second order object. In one or more arrangements, the action can be causing the autonomous vehicle to implement the determined driving maneuver or causing a current driving maneuver of the vehicle 100 to be modified. These and other examples of possible actions will be described in greater detail throughout this description.

Figure 2:
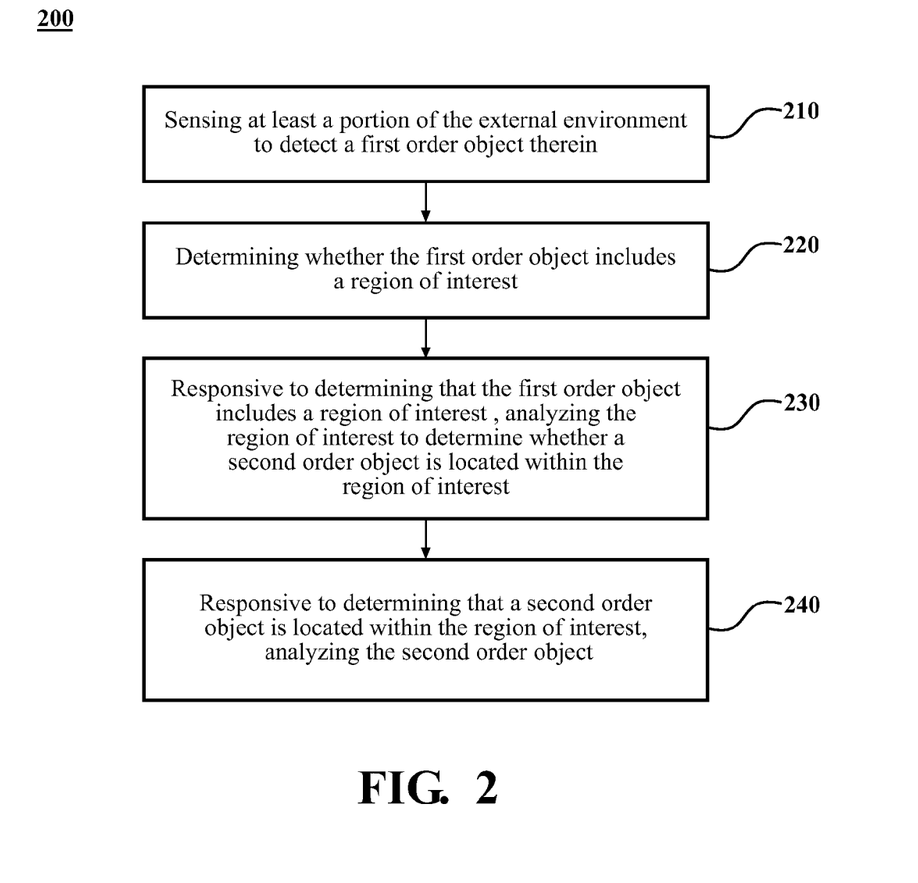
FIG. 2 is an example of a method of detecting one or more second order objects in an external environment.

Now that the various potential systems, devices, elements and/or components of the vehicle 100 have been described, various methods for operating such a vehicle in an external environment will now be described. Referring now to FIG. 2, an example of a method of detecting one or more second order object in an external environment is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, at least a portion of the external environment can be sensed to detect a first order object therein. The sensing of the external environment to detect the presence of one or more first order objects location therein can be performed by any suitable element or combination of elements of the vehicle 100. In one or more arrangements, the sensing of the external environment can be performed, at least in part, by the sensor system 125 (or component thereof), the camera system 127 (or portion thereof) and/or the processor 110. The first order object can be one or more other vehicles. The method 200 can continue to block 220.

At block 220, it can be determined whether the first order object includes a region of interest. Such a determination can be performed by any suitable element or combination of elements of the vehicle 100. For instance, in one or more arrangements, the determining can be performed by the processor 110, the sensor system 125, the camera system 127, the object classification/identification module 121 and/or the object analysis module 122. In one or more arrangements, the region of interest can be a translucent portion. For example, when the second order object is another vehicle, the translucent portion can be one or more windows. The following discussion of the method 200 will be described in connection with the region of interest being a translucent portion. However, it will be understood that the method is not limited to translucent portions. Indeed, the method can be used in connection with any kind of region of interest. The method 200 can continue to block 230.

At block 230, responsive to determining that the first order object includes a translucent portion, the translucent portion can be analyzed to determine whether a second order object is located within the translucent portion. In this context, "located within" means that the second order is detectable within a detection area defined by the translucent portion (or other region of interest) of the first order object. Such a determination can be performed by any suitable element or combination of elements of the vehicle 100. For instance, in one or more arrangements, the determining can be performed by the processor 110, the sensor system 125, the camera system 127, the object classification/identification module 121, and/or object analysis module 122. The method 200 can continue to block 240.

At block 240, responsive to determining that a second order object is located within the translucent portion, the second order object can be analyzed. Such analyzing can be performed by any suitable element or combination of elements of the vehicle 100. For instance, in one or more arrangements, the analyzing can be performed by the processor 110, the sensor system 125, the camera system 127, the object classification/identification module 121, and/or object analysis module 122. The second order object can be analyzed in any suitable manner. For instance, the behavior and/or movement of the second order object can be tracked and/or analyzed.

The method 200 can end. Alternatively, the method 200 can return to block 210. As a further alternative, the method 200 can include additional and/or alternative blocks (not shown). For instance, an action can be taken based at least in part on the analysis of the second order object. As an example, an alert, warning, and/or notification can be generated at least partially based on the analysis of the second order object. As another example, in the case of an autonomous vehicle or a vehicle operating in an autonomous mode, a future driving maneuver of the vehicle 100 can be determined at least partially based on the analysis of the second order object. In one or more arrangements, the future driving maneuver can be caused to be automatically implemented. In one or more arrangements, the processor 110 and/or the driving module 120 can cause the vehicle 100 to implement the future driving maneuver. The processor 110 and/or the driving module 120 can be operatively connected to one or more of the vehicle systems 160 to cause the future driving maneuver to be implemented. In one or more arrangements, the processor 110 and/or the driving module 120 can be operable to control the one or more actuators 140, which can control one or more of the vehicle systems 160 or portions thereof to implement the future driving maneuver.

In one or more arrangements, causing the future driving maneuver to be implemented can be performed automatically. In one or more arrangements, a vehicle occupant (e.g. a driver and/or other passenger) can be prompted to provide permission to implement the future driving maneuver. The vehicle occupant can be prompted in any suitable manner. For instance, a prompt can be presented on a display within the vehicle 100. Alternatively or in addition, the prompt can be audibly output to the vehicle occupant over one or more audial channels. Other forms of prompting can be used as an alternative or in addition to the above-described forms of prompting. Responsive to receiving an input corresponding to a vehicle occupant's approval to implement the future driving maneuver, the vehicle 100 can be caused to implement the future driving maneuver.

Figure 3:
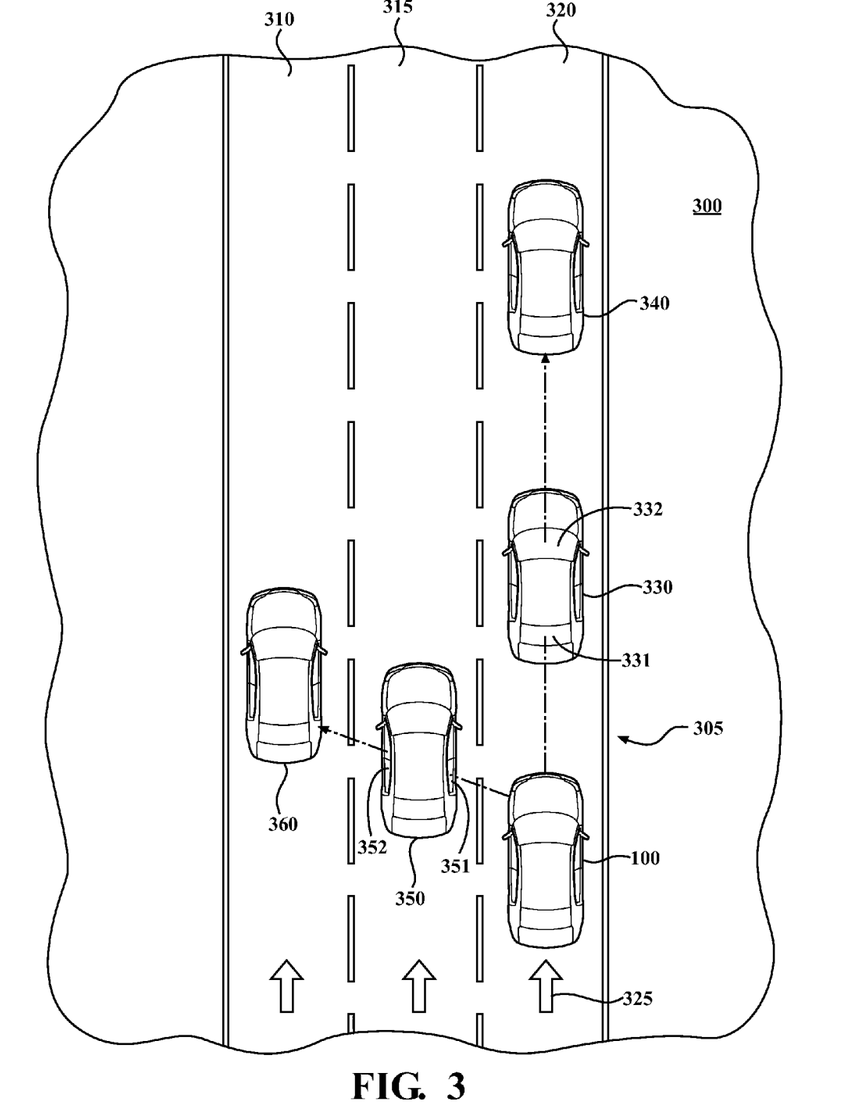
FIG. 3 is an example of a driving environment that includes one or more second order objects.
Figure 4:
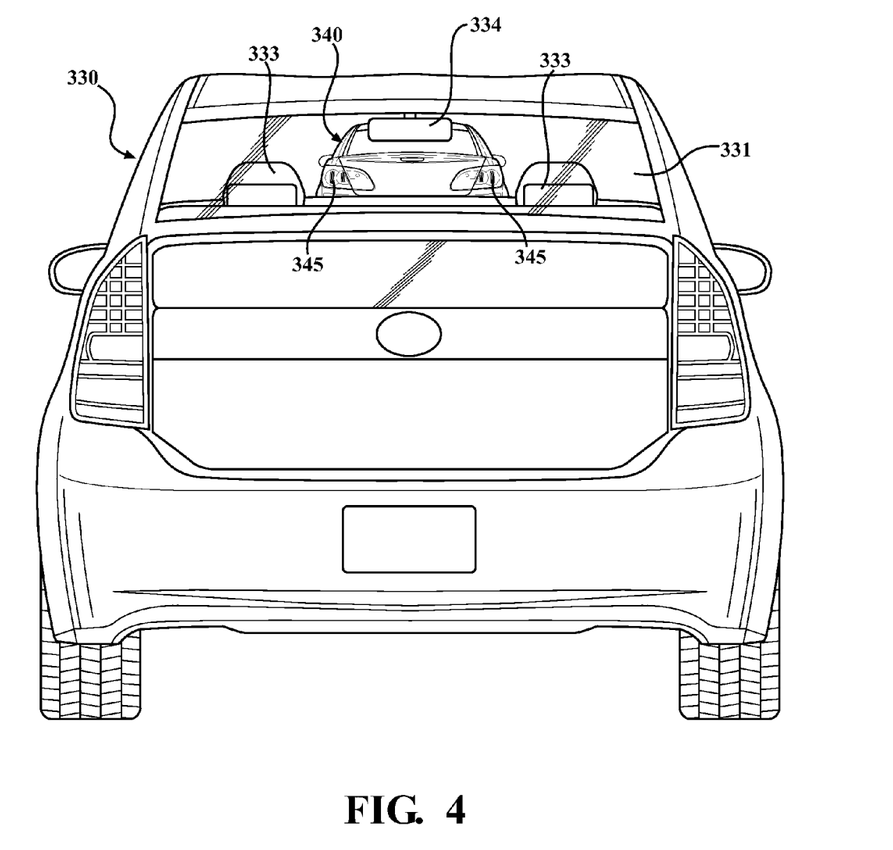
FIG. 4 is an example of a portion of the driving environment of FIG. 3, showing a second order object located within a translucent portion of a first order object.

One non-limiting example of the operation of the vehicle 100 in accordance with the method 200 will now be described in relation to FIGS. 3 and 4. For purposes of this example, the vehicle 100 can be traveling in an environment 300 that includes a road 305. As used herein, "road" means a thoroughfare, route, path or way between two places and upon which a vehicle can travel. A road may be paved or otherwise improved to facilitate travel by a vehicle thereon. In some instances, a road may be unpaved or undeveloped. A road may be a public road or a private road. The road can include or be a part of one or more bridges, tunnels, supporting structures, junctions, crossings, interchanges, and toll roads.

The road 305 can include a plurality of travel lanes, including a first travel lane 310, a second travel lane 315, and a third travel lane 320. As used herein, a "travel lane" is a portion of a road that is designated for use by a single line of vehicles and/or a portion of a road that is being used by a single line of vehicles. In some instances, the one or more travel lanes 310, 315, 320 can be designated by markings on the road 305 or in any other suitable manner. In some instances, the one or more travel lanes 310, 315, 320 may not be marked. The plurality of travel lanes 310, 315, 320 can be intended or designated for vehicular travel in a first direction 325.

It will be understood that arrangements shown and described herein with respect to the road 305 and the plurality of travel lanes 310, 315, 320 are provided merely as examples, and arrangements are not limited to the particular arrangements shown and described. Indeed, arrangements described herein can be used in connection with roads having any quantity, type and/or arrangement of travel lanes. For instance, arrangements described herein can be used in connection with any road configuration, including roads that have a greater quantity of travel lanes, a lesser quantity of travel lanes, and/or at least one travel lane that is intended or designated for vehicular travel is a different travel direction that the other travel lanes.

The vehicle 100 can be traveling on the road 305. The current travel path of the vehicle 100 can include traveling in the first direction 325 on the road 305. The current travel lane of the vehicle 100 can be travel lane 320. "Current travel lane" means a travel lane that a vehicle is traveling on at the present time.

The environment 300 can include a first other vehicle 330, a second other vehicle 340, a third other vehicle 350, and a fourth other vehicle 360. The second other vehicle 330 can include a rear window 331 and a front window 332. The third other vehicle 350 can include a first side window 351 and a second side window 352.

The first other vehicle 330, the second other vehicle 340, the third other vehicle 350, and the fourth other vehicle 360 can be traveling in the first direction on the road 305. The current travel lane of the first other vehicle 330 and the second other vehicle 340 can be the travel lane 320. The first other vehicle 330 and the second other vehicle 340 can be located forward of the vehicle 100 in the travel direction 325. The current travel lane of the third other vehicle 350 can be the travel lane 315. The current travel lane of the fourth other vehicle 360 can be the travel lane 310.

The third other vehicle 350 can be located on a left lateral side of the vehicle 100. At least a portion of the third other vehicle 350 can be located forward of the vehicle 100 in the travel direction 325. The fourth other vehicle 360 can be located on a left lateral side of the vehicle 100. At least a portion of the fourth other vehicle 360 can be located forward of the vehicle in the travel direction 325. The fourth other vehicle 360 can be located more forward of the vehicle 100 in the travel direction 325 than the third other vehicle 350, as is shown in FIG. 3.

The vehicle 100 can sense at least a portion of the environment 300, such as by using the sensor system 125 and/or the camera system 127 to acquire visual data and/or other information. In one or more arrangements, the visual data and/or other information can be initially processed initially to avoid corrupted data/information.

The vehicle 100 can detect any first order objects in the environment 300. At the moment shown in FIG. 3, the first order objects would include the first other vehicle 330 and the third other vehicle 350. In some arrangements, the vehicle 100 may be configured to identify the nature of the first order objects. For instance, the vehicle 100 can determine whether the first order objects are other vehicles. The identification of the nature of a first order object can be performed by, for example, the object classification/identification module 121 and/or the one or more processors 110.

The sensor system 125 may acquire any suitable information regarding the first order objects. For instance, the sensor system 125 can acquire the location and/or speed of the first order objects (the first other vehicle 330 and the third other vehicle 350 in FIG. 3). In some instances, the sensor system 125 may be able to acquire data or information related to the location and relative motion of one or more second order objects (e.g. the second other vehicle 340 and/or the fourth other vehicle 360) in the environment 300. Such data and information can be acquired by the sensor system 125 in any suitable manner. For instance, the sensor system can analyze the radar reflections of the second order objects. However, in at least some instances, such information or data may be unreliable due to severe occlusions and/or insufficient lateral accuracy of radar reflections, requiring confirmations by analyzing video data.

The vehicle 100 can determine whether the detected first order objects include a region of interest. For purposes of this example, the region of interest can be a translucent portion. In the arrangements shown in FIG. 3, one example of a translucent portion would include the rear window 331 and/or the front window of the first other vehicle 330. Another example of a translucent portion would be the first side window 351 and/or the second side window 352 of the third other vehicle 350.

With respect to the first other vehicle 330, it can be determined whether it includes a translucent portion (e.g. the rear window 331 and/or the front window 332). The determination of whether a first order object includes a translucent portion can be performed be the object classification/ identification module 121 and/or the one or more processors 110. In one or more arrangements, one or more high resolution images of at least a portion of the first order object (e.g. the first other vehicle 330 and/or the third other vehicle 350) can be captured, such as by the camera system 127. In such case, determining whether the first order object includes a translucent portion can, in one or more arrangements, include analyzing the captured one or more high resolution images. Any suitable analysis can be performed. As an example, the analysis can include comparing portions of the images to known images or information (e.g. in the predefined object profiles 118) or by one or more characteristics.

Responsive to determining that the first order object includes a translucent portion, the translucent portion can be analyzed to determine whether a second order object is located within the translucent portion. The analysis of the translucent portion can be performed by the one or more processors 110, the object classification/identification module 121 and/or the object analysis module 122. In one or more arrangements, the analysis can include extracting the translucent portion from whole images of at least a portion of the first order object.

Any suitable analysis of the translucent portion can be performed. For example, in one or more arrangements, analyzing the translucent portion can further include determining whether an object located within the translucent portion matches a predefined filtered object profile 119. Responsive to determining that one or more objects located in the translucent portion matches a predefined filtered object profile, the matching object(s) can be ignored or otherwise filtered and thus effectively ignored.

Thus, with respect to the first other vehicle 330, one or more structures appearing in the translucent portion (e.g. window 331 and/or window 332) can be identified and ignored or filtered. For instance, referring to FIG. 4, one or more head rests 333 and/or a rearview mirror 334 be located within the translucent portion. The one or more head rests 333 and/or the rearview mirror 334 can be identified by comparing images of such objects to the predefined filtered object profiles 119. If the object in the translucent portion matches one of the predefined filtered object profiles 119, the object can be ignored. Additional or alternative objects located within the translucent portion, such as human heads, can be ignored or filtered.

The analysis of the translucent portion can include determining whether an object located within the translucent portion is a second order object. In the arrangement shown in FIG. 4, an example of a second order object can be the second other vehicle 340, which is located within the translucent portion (e.g. window 331 and/or window 332). In one or more arrangements, the determination of whether an object located within the translucent portion is a second order object can be a direct determination by identifying the object, such as by the object classification/identification module 121 and/or the object analysis module 122. In one or more arrangements, the determination of whether an object located within the translucent portion is a second order object can be an indirect determination by assuming that any objects remaining after other objects are ignored or filtered are second order objects.

Responsive to determining that a second order object is located within the translucent portion, the second order object can be analyzed. The analysis of the second order object can be performed by one or more elements of the vehicle 100, including, for example, the one or more processors 110 and/or the object analysis module 122.

The second order object can be analyzed in any suitable manner. If a special part of the second order object is identified in the translucent portion, such as by the object classification/identification module 121, the then the motion of this part can be tracked. Such tracking may be achieved by analyzing visual data of the translucent portion over a period of time. For example, a plurality of individual video frames of the translucent portion can be analyzed so that the motion of the second order object relative to the vehicle 100 can be determined or predicted. As an example, when the second order object is another vehicle (e.g. the second other vehicle 340), the special part of the second order object can be, for example, a license plate. The motion of the license plate can be tracked across a plurality of video frames or images of the translucent portion over a period of time so that the motion of the second other vehicle 340 relative to the vehicle 100 can be determined.

As another example, the special part can be the taillights of a second order vehicle (e.g. the taillights 345 of the second other vehicle 340). In some instances, the taillights 345 may be illuminated because of low-light conditions, such as in the evening or night. Alternatively or in addition, the taillights 345 may be illuminated because of activation of the brakes of the second other vehicle 340. When illuminated, the taillights 345 are visible and can be detected within the translucent portion. The motion of the taillights 345 can be tracked across a plurality of video frames of the translucent portion so that the motion of the second other vehicle 340 relative to the vehicle 100 can be determined.

If a special part of a second order vehicle cannot be identified in the translucent region, then substantially the entire translucent portion can be analyzed over time. For example, the translucent portion can be analyzed to assess how the appearance of the translucent portion changes over time. In such case, the motion of a second order object can be inferred, such as by analyzing motion of various image patches of the second order vehicle. Without limitation, such analysis methods can include artificial or computational intelligence elements, e.g., neural network with deep learning, fuzzy logic or other machine learning algorithms.

It should be noted that arrangements are not limited to analyzing second order objects located in front of the vehicle 100. Indeed, arrangements described herein can be used to analyze second order objects in other locations relative to the vehicle 100. For instance, arrangements described herein can be used to analyze second order objects spaced from the vehicle 100 in the lateral direction 104. As an example, arrangements described herein can be used to analyze the fourth other vehicle 360. Further, arrangements described herein can be used to analyze second order objects that are located behind the vehicle 100 in the longitudinal direction 102.

It will be appreciated that some second order objects may be relatively close to the vehicle 100. Such second order objects can be readily tracked and/or analyzed by the sensor system 125, the object classification/identification module 121, and/or the object analysis module 122. However, some second order objects may be located beyond the range of the sensor system 125. In such instances, it may be more difficult to track and/or analyze such second order objects. In these and other instances, additional and/or alternative ways of tracking or analyzing the second order objects can be implemented.

In one or more arrangements, the object analysis module 122 can be configured to analyze a second order object using a light distance estimate approach. The object analysis module 122 can use the light energy emitted from one or more headlights or one or more taillights of a second order vehicle. The object analysis module 121 can analyze visual data captured by the camera system 127. A light source of a vehicle can be detected with appropriate sensors. The detected light source can be projected on the map in a suitable coordinate system (e.g. the vehicle's local coordinate system or a global coordinate system). The light source can be tracked over time in any suitable manner. For instance, the light source can be tracked over time by the object analysis module 122 by, for example, tracking successive positions of the light source with respect to the coordinate system. It should be noted that, in some instances, an object may appear to be moving consistent with the motion of a vehicle but has only a single light source. For example, a detected object may be a motorcycle or a vehicle with an inoperable headlight or taillight. In such case, the tracking of the single light can be performed as described herein.

When a second order object has a pair of light sources (e.g. two taillights or two headlights), the detected light sources may appear as a single light source if sufficiently far away. However, at some distances, the vehicle 100 can resolve the light sources as being separate individual light sources, thereby representing a vehicle. There is an unknown distance (Dy) between the vehicle 100 and the observed pair of lights. Also, there is an unknown separation distance (L) between the lights of the second order vehicle. The separation distance (L) can be generally approximated.

In one or more arrangements, the distance (Dy) can be calculated as follows: $Dy=(L*Cb)/(y*b)$. In this equation, b is a baseline separation distance of a pair of vehicle lights. The baseline separation distance (b) can be the distance between the left and the right lights of the vehicle 100. Alternatively, the baseline separation distance (b) can be an average across any group of vehicles. In the equation, Cb is a function of xb and Db. xb is the pixel separation of a pair of lights on an image corresponding to the baseline separation distance (b). The image can be an image taken at the resolution of one or more cameras 128 of the camera system 127. Db is the distance to the baseline pair of lights corresponding to xb, which depends on the camera resolution and/or accuracy of measuring the pixel separation, among other things. The function Cb is usually bilinear, i.e., $Cb=xb*Db$. In one or more arrangements, it can be implemented as a lookup table, which can be stored in the one or more data stores 115. In the equation, y is the pixel separation for the observed pair of lights based on an image of the pair of lights captured by the camera system 127.

The unknown separation distance (L) can be approximated based on known characteristics and/or features of the road infrastructure. In one or more arrangements, the baseline separation distance (b) can be set as 1.8 meters as an approximation of an average automobile on the road. A range of variations of the baseline separation distance (b) can be permitted, such as from 1.5 meters for small automobiles and 3 meters for trucks. As the separation distance (L) becomes closer to the assumed baseline separation distance (b), the risk of significantly overestimating the distance (Dy) can be reduced, thereby biasing the produced estimates of the distance (Dy) toward underestimating the distance (Dy) on average. For safety and/or other reasons, it may be beneficial to estimate the distance as being smaller than it actually is.

When the camera system 127 includes cameras 128 with greater resolution, the distance (Dy) can be determined by observing changes of the area of the brightest spot of the observed light over time in a plurality of captured images of the lights. For a typical on-road automotive vehicle, the brightest spot of the light may be concentrated in an area of approximately 0.1 square meter (approximately 1 square foot). The information can be used as a gauge of the distance (Dy).

Alternatively or in addition, the distance (Dy) can be determined by using a brightness-distance approach. Such an approach can provide for additional (and independent) means to estimate the distance (Dy). Such an approach can use a known relationship between the perceived brightness of the light sources and the distance to the light sources. For instance, it is known that the brightness of a light source is directly proportional to the luminosity of the light. It is also known that the brightness of a light source is inversely proportional to the square of the distance.

Vehicles can have a variety of headlights with different light output characteristics, including different luminosities. As such, the exact luminosity of a particular light source may not be known. However, in one or more arrangements, an average luminosity can be assumed. The average luminosity can be based on any group of vehicle light sources. For instance, the average luminosity can be based on any combination of lights (e.g. old lights, new lights, and/or high-intensity lights, etc.). Due to the vehicle pitching on non-flat roads and/or other factors affecting the observation angle of the camera system 127, the perceived brightness, even for assumed average (fixed) luminosity, may vary significantly. To account for such variances, a temporal filter can be applied over a sequence of images showing the same pair of lights.

Mathematically, the determination of the distance (Dy) using the known relationship between the perceived brightness of the light sources and the distance to the light sources can be expressed as: $Dy^2 \sim (Fy*Bb*Db^2)/(By*Fb)$. In this expression, Fy is detected luminosity of the light sources of the second order vehicle based on one or more imaged captured by the camera system 127. By is detected brightness of the light sources of the second order vehicle based on one or more imaged captured by the camera system 127.

Fb is the baseline luminosity. The baseline luminosity (Fb) can be established using any suitable combination of lights. In one or more arrangements, baseline luminosity (Fb) can be established by using a combination of high-intensity vehicle light sources and non-high intensity vehicle light sources.

In some instances, brightness of the lights sources in images acquired by the camera system 127 may not actually vary much with distance (e.g. due to gain control and/or blooming suppression artifacts). However, the area of the brightest spot would still vary with the distance, at least with cameras having high resolution. In one or more arrangements, the illuminated area, suitably calculated, can be used as a substitute for brightness. In one or more arrangements, an ordinary resolution camera can be used for the brightness-distance estimation approach and a high-resolution camera can be used for the separation length-distance approach.

Detection of the light sources of second order objects and their location can be measured from an image by determining the pixels with maximum brightness or by finding a center of gravity (COG) of the light source image, indicating the place where the light source is located. The area of the light source image and the registered level of pixel brightness used for the COG calculation can also be used for estimating the brightness of the light source (By). The color of the light source image could also be used for detection confirmation.

Inferring the distance (Dy) via both observation of the light pair and the perceived brightness-distance relationship can help to increase robustness of the system. For example, some second order vehicles encountered on the road might have one of the lights in the pair that is broken or is too dim to be well detected by the camera system 127 at a distance. In some instances, the second order object vehicle could actually be a motorcycle.

The vehicle 100 can include a learning system, which can be a part of the object analysis module 122 or other module or element of the vehicle 100. The learning system can be pre-calibrated to predict expected distance (Dy) by learning from observed changes of By_i (the light separation (y) if the light source image for the pair of lights is observed) over a sequence of known distances Dy_i. By is a function of bright pixel intensities and the total area, as well as viewing angle, which itself is a function of the terrain. These factors can be inputs to the learning system. The learning system can output the distance (Dy).

The viewing angle on flat roads is small and varies negligibly with distance beyond approximately 100 meters. However, the viewing viewing/illuminator angle can change significantly on a hilly or other non-flat road. Indeed, the changes can be substantial such that the vehicle's pair of lights may disappear momentarily from the view of the camera system 127. If information/data relating to the terrain of the road ahead is poor or unavailable, then the learning system may not use the viewing angle as input.

The learning system can also be adapted based on real-time observations. For example, the changes of the light brightness from the known distance (when the second order vehicle is well within the range of the sensor system 125) can be applied to the previously captured images. As a result, a sequence of values (By_i, Dy_i) can be obtained, which can be used for further learning.

Based on the analysis of the second order objects, the movement, behavior, and/or other things about the second order objects can be determined. For instance, it can be determined whether the second order objects are moving away from the vehicle 100, moving toward the vehicle 100, braking, swerving, and/or violating a traffic rule, just to name a few possibilities. Based on the analysis of the second order object, one or more actions can be taken.

For instance, information relating to the second order object can be presented to a vehicle occupant. As an example, a vehicle occupant can be alerted to the presence of a second order object or a behavior of a second order object. In one or more arrangements, it can be determined whether a second order object is exhibiting a predefined behavior. Responsive to determining that the second order object is exhibiting a predefined behavior, an alert, warning, or notification can be presented to a vehicle occupant. The alert, warning, or notification can be provided in any suitable form, including, for example, visual and/or audial.

In one or more arrangements, the vehicle 100 can be an autonomous vehicle. In such case, a driving maneuver for the vehicle 100 can be determined at least partially based on information about the second order object. The vehicle 100 can be caused to implement the determined driving maneuver. Such implementation of the determined driving maneuver can be performed automatically or in response to a user input.

As an example, the second order vehicle (second other vehicle 340 in FIG. 3) may begin braking, as determined by activated brake lights. The first order vehicle (first other vehicle 330 in FIG. 3) may not be slowing down, as determined by the non-activated brake lights. Alternatively, the tracked portions of the second order object in a region of interest may be growing in size. Thus, the vehicle 100 can determine that the second order object is moving toward the vehicle 100. In such instances, the vehicle 100 can determine a suitable driving maneuver. In one or more arrangements, the driving maneuver can be activating the braking system 164. Alternatively, the driving maneuver can be changing travel lanes to avoid collision if the second order object is braking too rapidly.

In one or more arrangements, the processor 110 and/or the driving module 120 can cause the vehicle 100 to implement the driving maneuver. The processor 110 and/or the driving module 120 can be operatively connected to one or more of the vehicle systems 160 to implement the driving maneuver. In one or more arrangements, the processor 110 and/or the driving module 120 can be operable to control the one or more actuators 140, which can control one or more of the vehicle systems 160 or portions thereof to implement the driving maneuver.

It should be noted that, in one or more arrangements, a vehicle occupant (e.g. a driver and/or other passenger) can be prompted to provide permission to implement the driving maneuver. The vehicle occupant can be prompted in any suitable manner. For instance, a prompt can be presented on a display within the vehicle 100. Alternatively or in addition, the prompt can be audibly output to the driver or other passenger over one or more audial channels. Other forms of prompting can be used as an alternative or in addition to the above-described forms of prompting. Responsive to receiving an input corresponding to a vehicle occupant's approval to implement the driving maneuver, the vehicle 100 can be caused to implement the driving maneuver.

It will be appreciated that arrangements described herein can provide numerous benefits, including one or more of the benefits mentioned herein. For example, arrangements described herein can improve the performance of an autonomous vehicle. Arrangements described herein can reduce risk and improve decision making for autonomous operational modes of a vehicle. Arrangements described herein can provide information to human drivers to make more informed driving decisions. Arrangements described herein can provide a degree of comfort and confidence to vehicle occupants. Further, arrangements described herein can potentially facilitate the safe operation of the vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of detecting objects in an external environment of a vehicle, the method comprising:
    sensing, with a sensor system, at least a portion of the external environment to detect a first order object therein;
    determining, using a processor operatively coupled to the sensor system, whether the first order object includes a translucent portion;
    responsive to determining that the first order object includes a translucent portion, analyzing, using the processor, the translucent portion to determine whether a second order object is located within the translucent portion, wherein the second order object is not associated with the first order object; and
    responsive to determining that a second order object is located within the translucent portion, analyzing the second order object.

2. The method of claim 1, wherein sensing at least a portion of the external environment to detect a first order object therein includes:
    capturing one or more high resolution images of at least a portion of the first order object, and
    wherein determining whether the first order object includes a translucent portion includes analyzing the captured one or more high resolution images to determine whether the first order object includes a translucent portion.

3. The method of claim 1, wherein analyzing the second order object located within the transparent portion includes detecting changes in the appearance of at least a portion of the second order object over a period of time.

4. The method of claim 3, wherein changes in appearance include changes in at least one of changes in size and brightness.

5. The method of claim 1, wherein analyzing the second order object located within the transparent portion includes tracking the motion of the second order object over a period of time.

6. The method of claim 1, wherein analyzing the translucent portion further includes:
   determining whether an object located in the translucent portion matches a predefined filtered object profile; and
   responsive to determining whether the object located in the translucent portion matches a predefined filtered object profile, ignoring the object.

7. The method of claim 1, further including presenting information relating to the second order object to a vehicle occupant.

8. The method of claim 1, further including:
   determining whether the second order object is exhibiting a predefined behavior; and
   responsive to determining that the second order object is exhibiting a predefined behavior, presenting an alert to a vehicle occupant.

9. The method of claim 1, wherein the vehicle is an autonomous vehicle, and wherein the method further includes:
   determining a driving maneuver for the autonomous vehicle at least partially based on information about the second order object.

10. The method of claim 9, further including:
    causing the autonomous vehicle to implement the determined driving maneuver.

11. A system for detecting objects in an external environment of a vehicle, the system comprising:
    a sensor system operable to sense at least a portion of the external environment to detect a first order object therein;
    a processor operatively connected to the sensor system, the processor being programmed to initiate executable operations comprising:
       determining whether the first order object includes a translucent portion;
       responsive to determining that the first order object includes a translucent portion, analyzing the translucent portion to determine whether a second order object is located within the translucent portion, wherein the second order object is not associated with the first order object; and
       responsive to determining that a second order object is located within the translucent portion, analyzing the second order object.

12. The system of claim 11, wherein the sensor system includes a high resolution camera, wherein the camera is configured to capture one or more high resolution images of at least a portion of the external environment, the one or more high resolution images including the first order object, and wherein determining whether the first order object includes a translucent portion includes analyzing the captured one or more high resolution images to determine whether the first order object includes a translucent portion.

13. The system of claim 11, wherein analyzing the second order object located within the transparent portion includes detecting changes in the appearance of at least a portion of the second order object over a period of time.

14. The system of claim 13, wherein changes in appearance include changes in at least one of changes in size and brightness.

15. The system of claim 11, wherein analyzing the second order object located within the transparent portion includes tracking the motion of the second order object over a period of time.

16. The system of claim 11, wherein analyzing the translucent portion further includes:
    determining whether an object located in the translucent portion matches a predefined object profile; and
    responsive to determining whether the object located in the translucent portion matches a predefined object profile, ignoring the object location in the translucent portion.

17. The system of claim 11, wherein the executable operations further include:
    presenting information about the second order object to a vehicle occupant.

18. The system of claim 11, wherein the vehicle is an autonomous vehicle, and wherein the executable operations further include:
    determining a driving maneuver for the autonomous vehicle at least partially based on information about the second order object.

19. The system of claim 18, wherein the executable operations further include:
    causing the autonomous vehicle to implement the determining driving maneuver.

20. A computer program product for detecting objects in an external environment of a vehicle, the computer program product comprising a non-transitory computer readable storage medium having program code embodied therein, the program code executable by a processor to perform a method comprising:
    sensing at least a portion of the external environment to detect a first order object therein;
    determining whether the first order object includes a translucent portion;
    responsive to determining that the first order object includes a translucent portion, analyzing, using a processor, the translucent portion to determine whether a second order object is located within the translucent portion, wherein the second order object is not associated with the first order object; and
    responsive to determining that a second order object is located within the translucent portion, analyzing, using the processor, the second order object.

* * * * *

UNITED STATES PATENT AND TRADEMARK OFFICE
CERTIFICATE OF CORRECTION

PATENT NO. : 9,434,382 B1
APPLICATION NO. : 14/662927
DATED : September 6, 2016
INVENTOR(S) : Danil V. Prokhorov and Xue Mei Page 1 of 1

It is certified that error appears in the above-identified patent and that said Letters Patent is hereby corrected as shown below:

In the Claims

Column 27, Line 41, add the word --and-- after "therein;".

Signed and Sealed this
Fourth Day of June, 2019

Andrei Iancu
*Director of the United States Patent and Trademark Office*